US007900325B1

(12) United States Patent
Mangone, Jr.

(10) Patent No.: US 7,900,325 B1
(45) Date of Patent: Mar. 8, 2011

(54) METHOD FOR FORMING A LOCKING ENCLOSURE (76) Inventor: Peter G. Mangone, Jr., Golden, CO (US)

( * ) Notice: Subject to any disclaimer, the term of this patent is extended or adjusted under 35 U.S.C. 154(b) by 644 days.

(21) Appl. No.: 12/023,632

(22) Filed: Jan. 31, 2008

(51) Int. Cl.
*A41B 99/00* (2006.01)

(52) U.S. Cl. .............................. 24/543; 24/559

(58) Field of Classification Search .............. None
See application file for complete search history.

(56) References Cited

U.S. PATENT DOCUMENTS

| 2,626,439 | A | * | 1/1953 | Mack, Sr. ................ 24/559 |
| 3,461,876 | A | * | 8/1969 | Miller, Jr. .............. 606/120 |
| 3,571,861 | A | * | 3/1971 | Olson .................. 24/30.5 R |
| 3,604,071 | A | * | 9/1971 | Reimels ................ 24/543 |
| 3,822,052 | A | * | 7/1974 | Lange .................. 251/10 |
| 4,212,303 | A | * | 7/1980 | Nolan ................... 606/120 |
| 4,220,301 | A | * | 9/1980 | Jacobs et al. ............ 248/74.3 |
| 4,291,698 | A | * | 9/1981 | Fuchs et al. ............. 606/232 |
| 4,386,752 | A | * | 6/1983 | Pavlak et al. ............ 248/73 |
| 4,581,481 | A | * | 4/1986 | Moretti ................. 174/135 |
| 5,423,831 | A | * | 6/1995 | Nates .................. 606/120 |
| 6,212,742 | B1 | * | 4/2001 | Baskin ................. 24/457 |
| 6,298,549 | B1 | | 10/2001 | Mangone, Jr. |
| 6,606,786 | B2 | | 8/2003 | Mangone, Jr. |
| 6,708,933 | B2 | * | 3/2004 | Girodo ................. 248/74.2 |
| 6,779,241 | B2 | | 8/2004 | Mangone, Jr. |
| 2005/0076482 | A1 | * | 4/2005 | Costa .................. 24/543 |
| 2008/0047124 | A1 | | 2/2008 | Mangone |

* cited by examiner

*Primary Examiner* — Jack W. Lavinder
(74) *Attorney, Agent, or Firm* — Drinker Biddle & Reath LLP

(57) ABSTRACT

A locking enclosure consisting of first and second members joined at one end by a living hinge and having, respectively, a flexible receptacle with an open recess and a foot portion configured to flex the receptacle as it enters the recess to lock the enclosure in a closed position, where damage to the living hinge and inadvertent opening of the enclosure are resisted by a pair of strips that project up from one end of the recess and down toward the recess bottom from the other end of the recess to engage corresponding slots in the foot.

20 Claims, 5 Drawing Sheets

METHOD FOR FORMING A LOCKING ENCLOSURE

FIELD OF THE INVENTION

This invention relates generally to a device with a living hinge and a resilient locking mechanism for forming a locking enclosure and more particularly to such a locking enclosure for enclosing portions of at least two articles in an adjacent relationship where the articles may subject the enclosure to twisting forces and the locking mechanism makes the overall device surprisingly resistant to inadvertently and unexpectedly twisting open as a result thereof.

BACKGROUND OF THE INVENTION

In many instances, it is desirable to enclose portions of a plurality of relatively rigid articles in a close relationship. Initially, relative movement between the relatively rigid articles may be permitted, but ultimately such relative movement must be restrained. For example, relative movement is encountered during the assembly of radiant heating tubing for a driveway but is not desirable after the final radiant heating tubing array has been fixed in place.

In one system for providing such radiant heating, the radiant heating tubing is attached to a wire mesh as the radiant heating tubing is being placed over the wire mesh in a desired relationship. This attachment is accomplished using ties of various types which are wrapped around portions of the wire mesh and the radiant heating tubing. In some instances, where additional strength is required, rebar is added to the wire mesh or rebar is used in place of the wire mesh. In either construction, conventional ties are used to locate the rebar or wire mesh or to attach the radiant heating tubing to the conventional rebar or wire mesh. In other types of construction where conventional rebar is used to strengthen a structure, such as construction using cement or concrete, pieces of conventional rebar are attached together using the conventional ties as or before they are moved into the desired location before pouring the cement or concrete. While conventional ties generally achieve their intended purpose, workers who use them find them time-consuming and bothersome to use.

Therefore, there exists a need for a convenient, reliable, and economic locking enclosure, such as a resilient locking enclosure with a living hinge, that can be used in lieu of conventional ties. Also, the radiant tubing or other relatively rigid articles to be held in place in the locking enclosure may resist the restraint, applying twisting forces thereto that may damage or open the locking enclosure. A locking enclosure with a living hinge that can successfully resist these forces and will not inadvertently and unexpectedly twist open will constitute a particularly useful contribution to this art.

BRIEF DESCRIPTION OF THE INVENTION

This invention provides an improved locking enclosure with a living hinge that can be used in an automatic operation to enclose and restrain portions of at least two relatively rigid articles in a desired relationship without opening inadvertently when the locking enclosure is subjected to twisting forces. In preferred embodiments of the invention, the at least two relatively rigid articles comprise portions of wire mesh or rebar and portions of the radiant heating tubing used in the installation of radiant heating at desired locations.

In one preferred embodiment of the invention, the locking enclosure comprises first and second members each having an inner surface and an outer surface. Each of the members has a central body portion, an integral pivot portion, and an integral locking portion. The pivot portion provides a pivotal connection for mounting the first and second members for pivotal movement between opened and closed positions. The central body portion can be any length so long as it can surround the relatively rigid articles that are to be enclosed.

The pivot portion includes a living hinge extending between and integral with each of the pivot portions, optionally having additional means for guiding the pivotal movement of the two members from the opened position to the closed position while buttressing the stability of the locking enclosure at the hinge. The guiding means may comprise an arcuate groove in one of the pivot portions and an outwardly projecting portion on the other of the pivot portions where the projecting portion moves in the arcuate groove as the two members move from the opened toward the closed or locked position while the pivot portions move together. The groove and the outwardly projecting portion preferably are dimensioned so that, when in the closed position, the groove and the outwardly projecting portion are in a contiguous relationship.

The locking portion on the first member comprises a flexible receptacle portion having a recess formed therein, and the locking portion on the second member comprises a foot portion configured to fit within the recess. The recess in the receptacle portion has a base surface and overhanging walls at its distal and proximal ends. A first guide in the form of a protruding strip projects from the distal overhanging wall toward the base surface of the recess and a second guide in the form of a protruding strip projects from the base surface of the recess toward the proximal overhanging wall.

A longitudinal slot is formed in the bottom surface of the foot and is located and dimensioned to pass over and receive both of the protruding strips as the foot is inserted into the recess. Also, a widened recess is formed in the leading edge of the foot portion and communicates with the slot to facilitate the movement of the slot over the strip portions as the foot is inserted in the recess.

Apparatus for moving the locking enclosure devices from an opened position to a closed position to enclose at least two relatively rigid articles may use a feed track that supports a row of these devices in an opened position and urges the row of devices toward an end plate of the tool so that the forwardmost device of the row of devices is urged against the end plate. The end plate may have a generally planar surface to be contacted by the facing surface of the forwardmost device. The tool will also has a force applying mechanism for applying force to spaced apart abutment portions of the device.

A guide in the apparatus projects inwardly from the generally planar surface toward the row of locking enclosure devices and has a first guiding surface and, spaced therefrom, a second guiding surface. The forwardmost device in the row of devices is urged against the generally planar surface of the end plate so that a control portion of one of the two members is facing one of the first and second guiding surfaces and a control portion of the other member is facing the other of the first and second guiding surfaces. The force applying apparatus is located relative to the abutment portions so that the force applying apparatus contacts the abutment portions to apply a force thereto to move the control portions of the first and second members into contact with the first and second guiding surfaces to cooperate in controlling the movement of the control portions of the members over the first and second guiding surfaces.

The first and second guiding surfaces of the apparatus are contoured to move the first and second members from an open position to a closed position containing the at least two relatively rigid members between the two members. The flexible receptacle portion and the foot portion are located so that the application of force to the abutment portions moves the foot portion into the recess in the receptacle portion. One apparatus that may be used as explained in the preceding paragraphs for automatically applying locking enclosures is described in U.S. Pat. Nos. 4,801,061 and 5,350,267, the disclosures of which are hereby incorporated by reference.

BRIEF DESCRIPTION OF THE DRAWINGS

Illustrative and presently preferred embodiments of the invention are shown in the accompanying drawings in which.

DETAILED DESCRIPTION

Figures 1, 2:
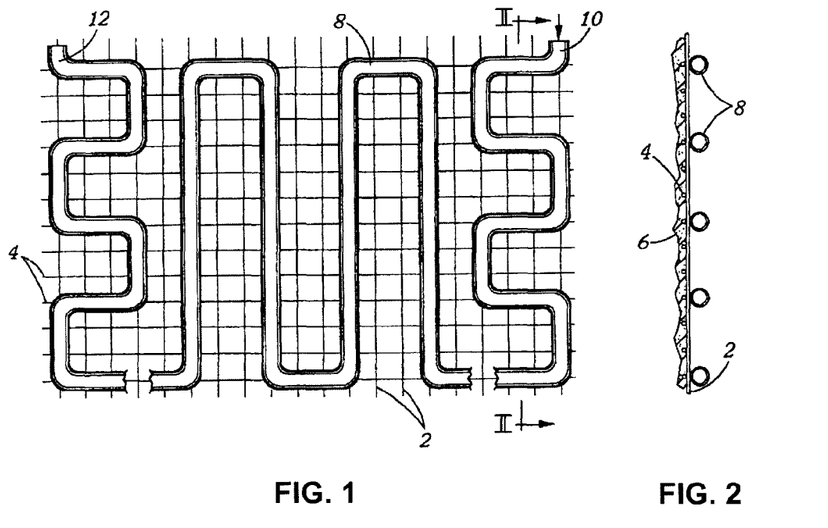
FIG. 1 is a top plan view of a portion of a conventional radiant heating structure for use in providing radiant heating for a suitable location such as a driveway.
FIG. 2 is a cross-sectional view taken on the line II-II of FIG. 1.

One of the many types of different installation designs used to provide radiant heating for a variety of structures such as driveways, athletic fields and others is illustrated in FIGS. 1 and 2. The design comprises a conventional wire mesh comprising intersecting wires 2 and 4 that are secured together at various intersections. The wire mesh is preferably laid over a bed of particulate material which, as illustrated in FIG. 2, comprises sand 6 but can comprise other types of particulate material such as pebbles, styrofoam, and other materials having similar characteristics. Radiant heating tubing 8 is installed over the wire mesh. As illustrated in FIG. 1, the radiant heating tubing 8 has a plurality of straight sections and curved sections that extend in different directions. The radiant heating tubing 8 has an inlet 10 and an outlet 12 so that a heating fluid may be passed through the radiant heating tubing. It is understood that there will be many sections of radiant heating tubing 8 for an overall structure. The wires 2 and 4 forming the wire mesh typically have diameters of between about 0.156 and 0.500 inch and the radiant heating tubing may have diameters between about 0.375 and 0.875 inch. The present invention, however, may be used for restraining a far wider range of rigid member sizes.

Figure 3:
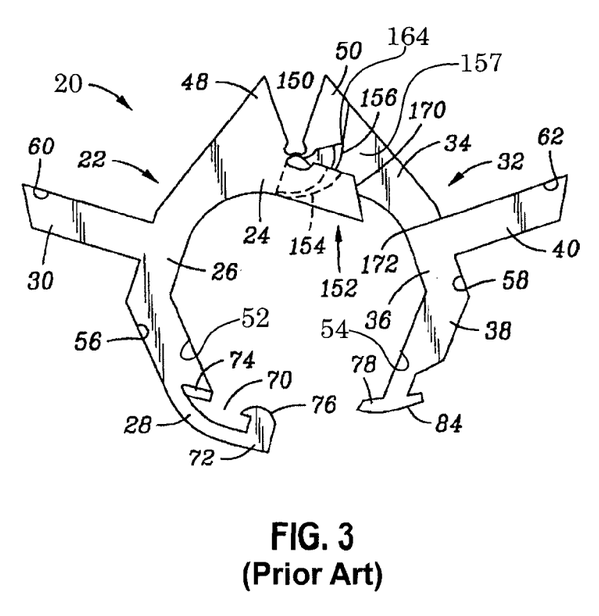
FIGS. 3 and 4 are front and rear elevation views of a prior art locking enclosure.
Figure 4:
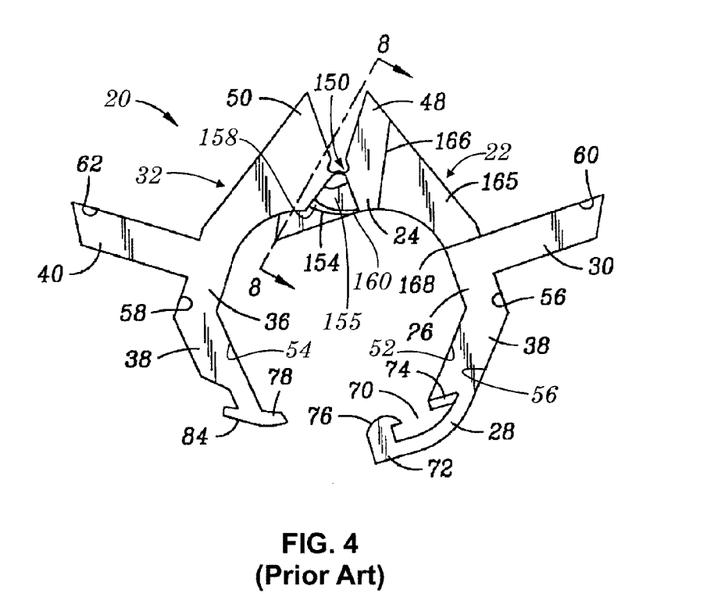

The construction of a prior art locking enclosure 20 (improved in accordance with the invention as described below in connection with later FIGS. 6-10) is illustrated in FIGS. 3-4. This prior art locking enclosure comprises first and second members 22 and 32. The first member comprises a pivot portion 24, a central body portion 26 preferably integral with the pivot portion 24, a locking portion 28 preferably integral with the central body portion 26, and an abutment portion 30 preferably integral with the central body portion 26 and extending outwardly therefrom. Second member 32 comprises a pivot portion 34, a central body portion 36 preferably integral with the pivot portion 34, a locking portion 38 preferably integral with the central body portion 36, and an abutment portion 40 preferably integral with the central body portion 36 and extending outwardly therefrom. Members 22 and 32 have facing inner surfaces 52 and 54 and outer surfaces 56 and 58 and abutments 30 and 40 have respective abutment surfaces 60 and 62. Members 22 and 32 also include respectively abutments 48 and 50 positioned to move into an abutting relationship to limit the movement of the device 20 to a fully opened position.

Pivot portions 24 and 34 are joined by a living hinge 150 that extends between and is integral with pivot portions 24 and 34. Living hinge 150 may be combined with guide apparatus 152 comprising an arcuate groove 154 formed in the bottom surface 155 of the pivot portion 24 and an arcuate projection 156 formed on the top surface 157 of the pivot portion 34 and shaped correspondingly to the arcuate groove 154 to facilitate rotational movement therebetween. The arcuate groove 154 may be tapered as shown with a wide entrance portion 158 and a narrow end portion 160 and the arcuate projection 156 has a narrow entrance portion and a wide end portion 164 dimensioned to fit snuggly and move in groove 154. When the device is in the fully closed position the wide end portion 164 of the arcuate projection 156 is located in the wide entrance portion 158 of the arcuate groove 154 and the narrow entrance portion 162 of the arcuate projection 156 is located in the narrow end portion 160 of the arcuate groove 154. The dimensions of the arcuate groove 154 and the arcuate projection 156 are such that, when the device 148 is in the fully closed position, the arcuate projection 156 and the arcuate groove 154 are in a contiguous relationship. This together with the locking portions 28 and 38 helps enable the enclosure to become rigid in its locked position. These features are described in more detail in U.S. Pat. No. 6,779,241, col. 10 lines 30-60, the disclosure of which is incorporated by reference.

Locking portion 28 includes a flexible arm 72 with an upwardly opening recess 70. Recess 70 in turn has a protruding strip 74 at its distal end projecting downwardly into the recess and locking portion 38 has a foot portion 78 that is contoured to cooperate with recess 70 when members 22 and 32 are in the closed position, as described in detail in U.S. Pat. No. 6,779,241 at col. 6 line 63 to col. 7 line 19, the disclosure of which is incorporated by reference.

Figure 5A:
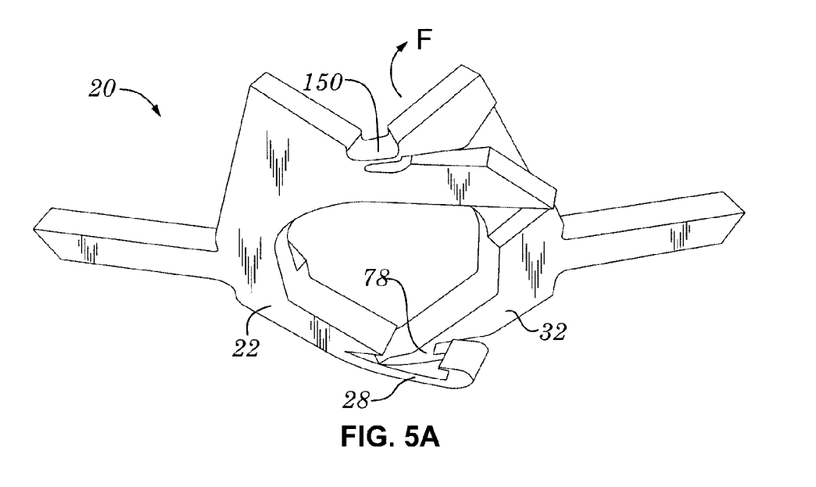
FIGS. 5A and 5B are views, in perspective, of a prior art locking enclosure being subjected to twisting forces and opening as a result thereof.
Figure 5B:
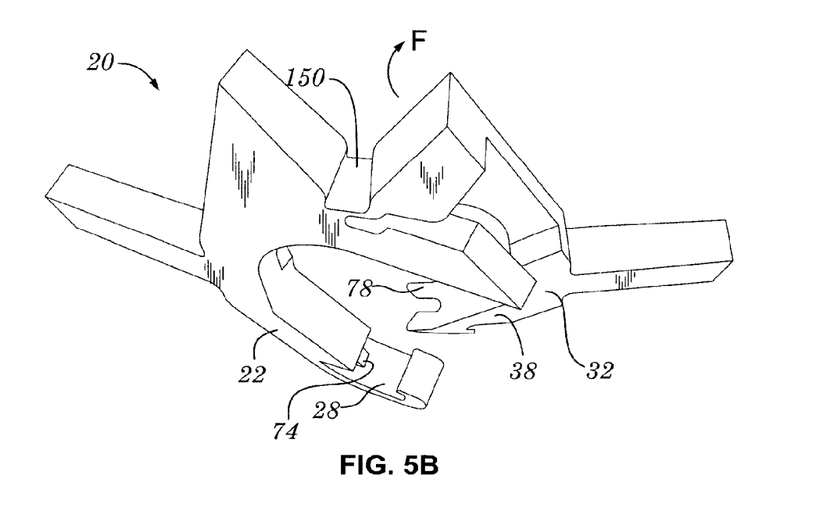

Unfortunately, prior art locking enclosures as described above and illustrated in FIGS. 3-4 may inadvertently twist open. This is illustrated in FIGS. 5A and 5B. Thus, when a lateral force F is applied to member 32 while member 22 remains generally stationary, member 32 may twist away from member 22 as shown in FIG. 5A with a concomitant lateral bending at living hinge 150. Since the living hinge is not designed for such lateral movement, it may be permanently distorted impairing its intended functionality or it may tear if the lateral movement is too great. Additionally, foot portion 78 of locking portion 38 will slide out of recess 70 generally laterally along with the twisting movement member 32. If and when the foot portion 78 of locking portion 38 clears strip 74 of recess 70, locking portions 28 and 38 will be fully released as shown in FIG. 5B. The present invention offers a unique modification to such prior art locking enclosures that prevents twisting relative movement between members 22 and 32 and hence both protects the living hinge from damage due to lateral movement between the members and prevents resulting inadvertent opening of the locking enclosure.

Figure 6:
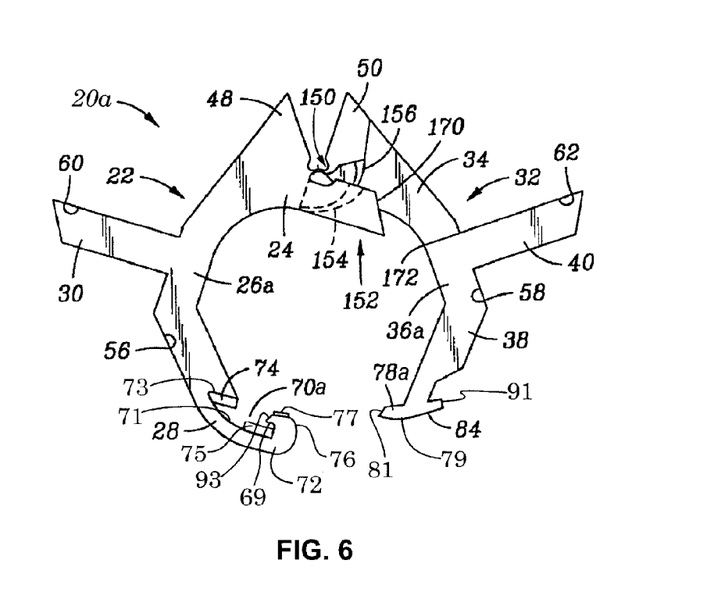
FIG. 6 is a front elevation view of a locking enclosure in accordance with the invention.
Figure 6A:
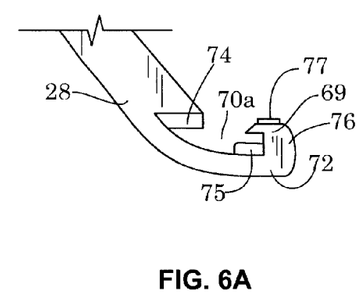
FIGS. 6A and 6B are enlarged partial views of the locking portions of the locking enclosure of the invention.
Figure 6B:
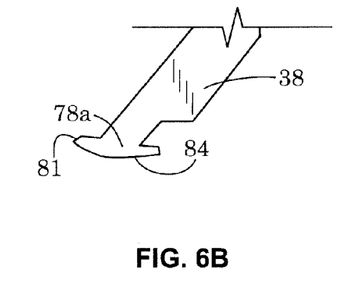
Figure 6C:
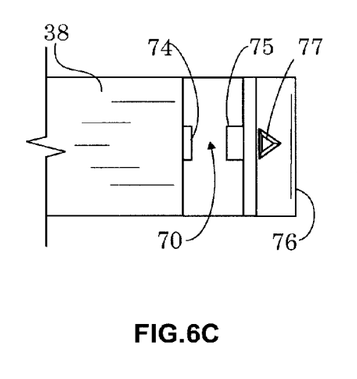
FIG. 6C is a partial enlarged view of a triangular protuberance on a guide surface which helps direct locking portions into engagement.

Turning now to FIGS. 6, 6A and 6B, locking portion 28 of modified device 20*a* comprises first and second members 22 and 32 joined by a living hinge 150 as described above in connection with prior art device 20. In a preferred embodiment of this invention, members 22 and 32 are integrally molded using a plastic material such as a polyethylene, a nylon or another plastic material having similar characteristics including particularly the ability to form an integral living hinge between the two members. Modified device 20*a* has a flexible receptacle portion 72 having a recess 70*a* formed therein, and the locking portion 38 on the second member comprises a foot portion 78*a* configured to fit within the recess. The recess in the receptacle end includes a base surface 71 and an overhanging wall 69 at its distal end. The outer surface of overhanging wall 69 is radiused as shown to form a guide surface 76. Additionally, a guide protuberance 77, preferably of a regular triangular in shape as shown in FIG. 6C, may be provided to help facilitate the engagement of the locking portions by directing the foot portion into alignment with the recess. Preferably, a vertex of the triangular portion will be directed toward foot portion 78*a* to best cooperate with bevels 87, which are described below. A first guide in the form of a protruding strip 74 projects from the proximal overhanging wall 73 toward the base surface of the recess. A second guide in the form of a protruding strip portion 75 is located at the distal end of the recess and projects upwardly from base surface 71 toward the distal overhanging wall 69.

Figure 6D:
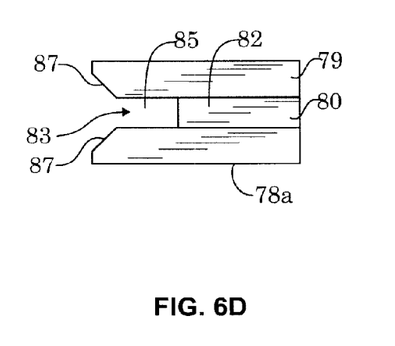
FIG. 6D is a bottom view of the locking foot of the invention.

Locking portion 38 in turn includes a foot portion 78*a* with a bottom surface 79 configured to ride along guide surface 76 as locking portions 28 and 38 engage and foot portion 78*a* enters recess 70*a* in the receptacle portion. The leading or distal edge of the foot portion may include a beveled edge 81 which contacts the underside of overhanging wall 73 as locking portions 28 and 38 engage and foot portion 78*a* enters recess 70*a*. As best seen in FIGS. 6C and 6D, a longitudinal slot 80 with a bottom 82 is formed in underside 79 of the foot and is located and dimensioned to pass over and receive guide protuberance 77 when foot portion 78*a* is engaged in recess 70*a*. Foot portion 78*a* also may include an entry 83 including a through-slot 85 extending from foot bottom surface 79 to the top of the foot. This through-slot is dimensioned to clear and engage strip portion 74 when the foot enters recess 70*a*. Additionally, the leading edge of the foot may include levels 87 angled inwardly toward slot 80 to facilitate the initial engagement of locking portions 28 and 38, first guiding the foot over protuberance 77 and later guiding through-slot 85 over strip 74.

Thus, as members 22 and 32 are moved toward a closed position, bevels 87 facilitate the engagement of foot portion 78*a* with protuberance 77 as the underside 79 of foot portion 78*a* rides over guide surface 76 causing arm 72 to flex downwardly. As foot portion 78*a* moves into recess 70*a*, the trailing end 91 of the foot clears the hook end 93 of distal overhanging wall 69 with strip 75 moving into slot 80 and flexible arm 72 moving back to its original position. The engagement of the slot with both the downwardly and the upwardly projecting strips ensures that the foot will be securely held in the recess in a manner that resists a release due to twisting in prior art devices, as illustrated in FIG. 5A or 5B. This twisted release resistant configuration cooperates with living hinge 150 to produce a device which resists opening or destruction by twisting movement of locking enclosure device 20*a* surprisingly well, as compared to prior art devices (e.g., that of FIGS. 3 and 4). Furthermore, this twisted release resistant configuration additionally cooperates with guide apparatus 152 to further enhance the resistance of the device to opening or destruction by twisting movement.

Figure 7:
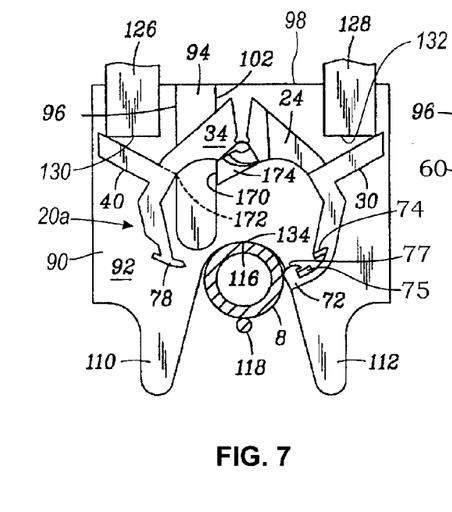
FIGS. 7-10 illustrate the movement of the locking enclosure of the invention from an open position to a closed position.
Figure 10:
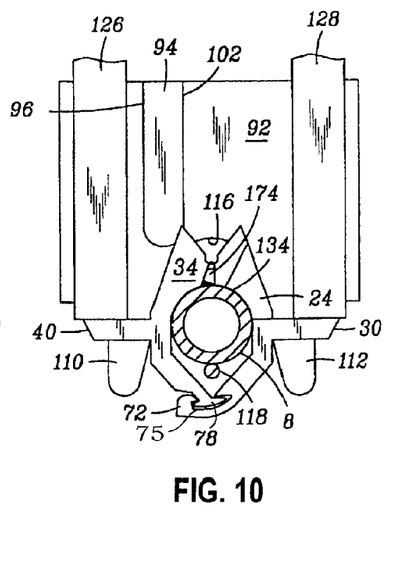

The movement of locking enclosure 20*a* from an open position as illustrated in FIG. 7, to a closed position as illustrated in FIG. 10, may be controlled by a tool of the type illustrated in U.S. Pat. Nos. 4,801,061 and 5,350,267 which are incorporated herein in regard to the structure and operation of the tool by reference thereto. In such a tool, a plurality of locking enclosures 20*a* in the opened position, illustrated in FIG. 7, are supported on a magazine and preferably resiliently urged toward the planar surface 92 of an end plate 90. Pivot portions 24 and 34 of the locking enclosure preferably have a total thickness that is slightly less than the thickness of the central body portions 26 and 36, the locking portions 28 and 38 and the abutment portions 30 and 40 so that the facing surface of the foremost device 20 is compatible with the generally planar surface 92.

Figure 8:
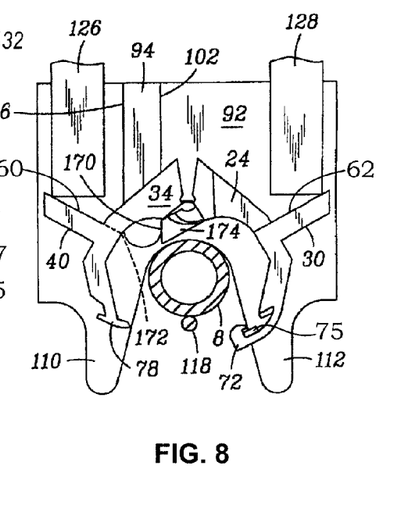
Figure 9:
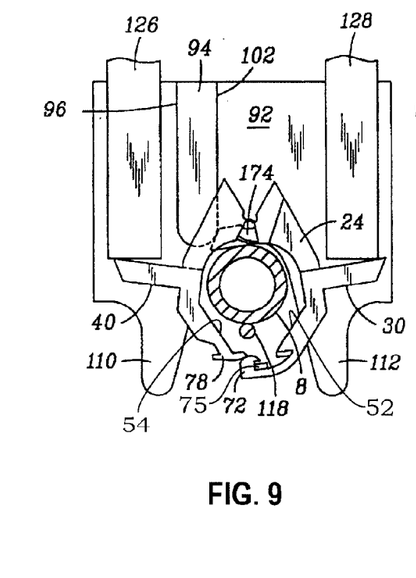

The movement of locking enclosure 20 from an open position to a closed position is illustrated in FIGS. 7-10. In FIG. 7, the foremost device 20*a* has been moved against the generally planar surface 92. The tool has two spaced apart force applying plungers 126 and 128 having lower surfaces 130 and 132 located to contact a portion of the abutment surfaces 60 and 62 to apply an equal amount of force to the abutments 30 and 40. As illustrated in FIG. 7, the portion 134 of the end plate 90 has been placed in contact with the portion 116 of a radiant heating tube 8. As the plungers 126 and 128 begin to apply force, at least the control portion of the control surface 170 moves into contact with the first portion 102 and the control portion of the control edge 172 moves into contact with the first portion 96 to hold the pivotally connected members 22 and 32 in the opened position as the device 148 is moved downwardly over the generally planar surface 92. As the force is continued to be applied, the foremost device 20*a* is moved over the generally planar surface 92 with at least a control portion of the control surface 170 in contact with the second portion 102 and the control portion of the control edge 172 almost out of contact with the first portion 96 so that the end device 20 is ready to be moved into a partially closed position as illustrated in FIG. 8. Guide surfaces 96 and 102 of guide 94 extend for a greater distance to insure that the device 20 remains in an opened position until the device has moved over the heating tube 8 and the wire 118.

As the foremost device 20*a* continues to be moved downwardly over the generally planar surface 92, the lower edges 174 of pivot portion 24 moves into contact with portion 116 to stop the downward movement of the foremost device 20*a*. As the downward directed force is still being applied by the force applying plungers 126 and 128, either the end plate 90 and therefore the tool is moved upwardly or the heating tube 8 and the portion 118 are moved downwardly away from the edge 134. The locking portions 28 and 38 have been moved toward each other so that the foot portion 78 has moved into contact with the flexible arm 72 to begin to apply a force thereto and the heating tube 8 and the wire portion 118 are enclosed within the inner surfaces 52 and 54 of members 22 and 32. The plungers 126 and 128 continue to apply a force to the abutments 30 and 40 to move the locking members 28 and 38 so that foot 78*a* deflects the flexible arm 72 and snaps into the recess 70*a* as the flexible arm 72 moves back to its original position as described above and illustrated in FIG. 10. Although illustrated in FIG. 10, the area enclosed by the inner surfaces 52 and 54 is slightly greater than the area of the heating tube 8 and the wire portion 118, a tighter fit may of course be achieved by shortening members 24 and 34.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A locking enclosure for enclosing portions of at least two relatively rigid articles comprising:
    first and second members each having a first end, a second end and a central body portion located between the first end and the second end;
    each of the first and second members further comprising a connecting portion at the first end and a locking portion at the second end;
    the connecting portion of the first member being movably attached to the connecting portion of the second member by a living hinge allowing the first and second members to pivot relative to one another between an opened position and a locked position for enclosing the at least two relatively rigid articles;
    the locking portion of the first member comprising a flexible end portion having an upwardly directed recess therein having proximal and distal overhanging walls;
    the locking portion of the second member comprising a foot portion configured to mate with the first member recess;
    a first protruding strip projecting from the proximal overhanging wall and a second protruding strip projecting toward the distal overhanging wall; and
    a slot in the foot portion positioned to receive the protruding strips when the foot portion is located in the recess in the enclosure when the first and second members are in the locked position.

2. The locking enclosure of claim 1 in which a distal portion of the slot extends through the foot portion.

3. The locking enclosure of claim 1 in which the first protruding strip projects downwardly from the proximal overhanging wall toward the base of the recess and the second protruding strip projects upwardly from the distal end of the base of the recess.

4. The locking enclosure of claim 1 in which the distal overhanging wall includes an outer surface that engages the foot portion as the first and second members are moved toward the locked position and a guide protuberance on the outer surface to help direct the foot portion into alignment with the recess.

5. The locking enclosure of claim 4 in which the protuberance is of a regular triangular shape with a vertex of the triangular shape directed toward the foot portion.

6. The locking enclosure of claim 4 in which the slot is beveled at its distal end to facilitate the engagement of the foot portion in the second member with the recess in the first member.

7. The locking enclosure of claim 6 in which the slot has two opposite bevels and the bevels are positioned to engage the guide protuberance.

8. The locking enclosure of claim 1 including pivot portions on each of the first and second members associated with the living hinge, the pivot portions including means for guiding the pivotal movement of the members from the opened position to the closed position while buttressing the stability of the locking enclosure at the living hinge.

9. The locking enclosure of claim 8 in which the guiding means comprises an arcuate groove in one of the pivot portions and an outwardly projecting portion on the other of the pivot portions respectively positioned so that the projecting portion moves in the arcuate groove as the two members move from the opened toward the locked position.

10. A locking enclosure for enclosing portions of at least two relatively rigid articles comprising:
    first and second members each having a first end, a second end opposite the first end and a central body portion located between the first end and the second end;
    each of the first and second members further comprising a connecting portion at the first end and a locking portion at the second end;
    the connecting portion of the first member being movably attached to the connecting portion of the second member by a living hinge allowing the first and second members to pivot relative to one another between an opened position and a locked position for enclosing the at least two relatively rigid articles within the inner surfaces;
    the locking portion on the first member comprising a flexible end portion having an upwardly directed recess therein having proximal and distal overhanging walls,
    the distal overhanging wall including an outer surface that engages the foot portion as the first and second members are moved toward the locked position and a guide protuberance on the outer surface to help guide the engagement of the locking portions;
    the locking portion on the second member comprising a foot portion configured to mate with the first member recess;
    a first protruding strip projecting downwardly from the proximal overhanging wall toward the base of the recess and a second protruding strip projecting upwardly from the base of the recess toward the distal overhanging wall; and
    a slot in the foot portion positioned to receive the protruding strips when the foot portion is located in the recess in the enclosure when the first and second members are in the locked position.

11. The locking enclosure of claim 10 in which a distal portion of the slot extends through the foot portion.

12. The locking enclosure of claim 10 in which the guide protuberance is of a regular triangular shape with apex of the triangular shape directed toward the foot portion.

13. The locking enclosure of claim 10 in which the slot is beveled at its distal end to facilitate the engagement of the foot portion in the second member with the recess in the first member.

14. The locking enclosure of claim 13 in which the slot has two opposite bevels and the bevels are positioned to engage the guide protuberance.

15. The locking enclosure of claim 1 including pivot portions on each of the first and second members associated with the living hinge, the pivot portions including means for guiding the pivotal movement of the members from the opened position to the closed position while buttressing the stability of the locking enclosure at the living hinge.

16. The locking enclosure of claim 15 in which the guiding means comprises an arcuate groove in one of the pivot portions and an outwardly projecting portion on the other of the pivot portions positioned so that the projecting portion moves in the arcuate groove as the two members move from the open toward the locked position.

17. A locking enclosure for enclosing portions of at least two relatively rigid articles comprising:
    first and second members each having a first end, a second end opposite the first end and a central body portion located between the first end and the second end;
    each of the first and second members including a connecting portion at the first end and a locking portion at the second end;
    the connecting portion of the first member being movably attached to the connecting portion of the second member by a living hinge allowing the first and second members to pivot relative to one another between an opened position and a locked position for enclosing the at least two relatively rigid articles within the inner surfaces;
    each of the first and second members further including pivot portions on each of the first and second members associated with the living hinge, the pivot portions including means for comprising an arcuate groove in one of the pivot portions and an outwardly projecting portion on the other of the pivot portions positioned so that the projecting portion moves in the arcuate groove as the two members move from the opened toward the locked position;
    the locking portion on the first member comprising a flexible end portion having an upwardly directed recess therein having proximal and distal overhanging walls;
    the locking portion on the second member comprising a foot portion configured to mate with the first member recess;
    a first protruding strip projecting downwardly from the proximal overhanging wall toward the base of the recess and a second protruding strip projecting upwardly from the base of the recess toward the distal overhanging wall; and
    a slot in the foot portion positioned to receive the protruding strips when the foot portion is located in the recess in the enclosure when the first and second members are in the locked position.

18. The locking enclosure of claim 17 in which the distal overhanging wall includes an outer surface that engages the foot portion as the first and second members are moved toward the locked position and a guide protuberance on the outer surface to help direct the foot portion into alignment with the recess.

19. The locking enclosure of claim 18 in which the protuberance is of a regular triangular shape with a vertex of the triangular shape directed toward the foot portion.

20. The locking enclosure of claim 18 in which the slot is beveled at its distal end to facilitate the engagement of the foot portion in the second member with the guide protuberance.

* * * * *